United States Patent
Vega et al.

(10) Patent No.: US 11,380,879 B2
(45) Date of Patent: Jul. 5, 2022

(54) METHOD FOR FORMING AN SEI LAYER ON AN ANODE

(71) Applicant: Nanoscale Components, Inc., Hudson, NH (US)

(72) Inventors: Jose A. Vega, Nashua, NH (US); Asela Maha Acharige, Brookline, NH (US); Ronald A. Wohl, Woodside, CA (US)

(73) Assignee: Nanoscale Components, Inc., Hudson, NH (US)

( * ) Notice: Subject to any disclaimer, the term of this patent is extended or adjusted under 35 U.S.C. 154(b) by 64 days.

(21) Appl. No.: 16/634,281

(22) PCT Filed: Jul. 9, 2018

(86) PCT No.: PCT/US2018/041219
§ 371 (c)(1),
(2) Date: Jan. 27, 2020

(87) PCT Pub. No.: WO2019/014094
PCT Pub. Date: Jan. 17, 2019

(65) Prior Publication Data
US 2020/0161625 A1    May 21, 2020

Related U.S. Application Data

(60) Provisional application No. 62/530,609, filed on Jul. 10, 2017.

(51) Int. Cl.
*H01M 4/04*    (2006.01)
*H01M 10/42*   (2006.01)
(Continued)

(52) U.S. Cl.
CPC ........... *H01M 4/0402* (2013.01); *H01M 4/40* (2013.01); *H01M 4/58* (2013.01); *H01M 10/42* (2013.01)

(58) Field of Classification Search
None
See application file for complete search history.

(56) References Cited

U.S. PATENT DOCUMENTS 2,574,844 A    11/1951    Roden
2,943,033 A     6/1960    Blue et al.
(Continued)

FOREIGN PATENT DOCUMENTS

JP    63-230706    9/1988
JP    03-166391    7/1991
(Continued)

OTHER PUBLICATIONS

Koch, V. R. et al., "The Stability of the Secondary Lithium Electrode in Tetrahydrofuran-Based Electrolytes", Journal of the Electrochemical Society, 125(9), 1978, 1371-1377.
(Continued)

*Primary Examiner* — Christopher P Domone
(74) *Attorney, Agent, or Firm* — Elmore Patent Law Group, P.C.; Carolyn S. Elmore

(57) ABSTRACT

The present invention relates to a method for forming an SEI layer on an anode by using a non-electrochemical process for alkaliating anodes, resulting in reductions of the manufacturing capital requirements, time investments and energy consumed during industrial battery production.

9 Claims, 6 Drawing Sheets

(51) Int. Cl.
*H01M 4/40* (2006.01)
*H01M 4/58* (2010.01)

(56) References Cited

U.S. PATENT DOCUMENTS

| | | | |
|---|---|---|---|
| 3,994,789 A | 11/1976 | Langer | |
| 4,029,564 A | 6/1977 | Higuchi et al. | |
| 4,130,500 A | 12/1978 | Melendres et al. | |
| 4,263,117 A | 4/1981 | Pignan et al. | |
| 4,853,304 A | 8/1989 | Ebner et al. | |
| 4,919,911 A | 4/1990 | Shirota et al. | |
| 4,940,640 A | 7/1990 | MacDiarmid | |
| 5,023,149 A | 6/1991 | MacDiarmid et al. | |
| 5,069,683 A | 12/1991 | Fong et al. | |
| 5,166,063 A | 11/1992 | Johnson | |
| 5,374,491 A | 12/1994 | Brannan et al. | |
| 5,436,093 A | 7/1995 | Huang et al. | |
| 5,516,602 A | 5/1996 | Uemichi | |
| 5,595,837 A | 1/1997 | Olsen et al. | |
| 5,712,059 A | 1/1998 | Barker et al. | |
| 5,721,067 A | 2/1998 | Jacobs et al. | |
| 5,743,921 A | 4/1998 | Nazri et al. | |
| 5,753,388 A | 5/1998 | Koksbang et al. | |
| 5,759,715 A | 6/1998 | Barker et al. | |
| 5,928,212 A | 7/1999 | Xue | |
| 6,022,643 A | 2/2000 | Lee et al. | |
| 6,068,755 A | 5/2000 | Matsuda et al. | |
| 6,176,995 B1 | 1/2001 | Schneider | |
| 6,475,670 B1 | 11/2002 | Ito | |
| 6,645,452 B1 | 11/2003 | Barker et al. | |
| 7,122,106 B2 | 10/2006 | Lin et al. | |
| 7,169,284 B1 | 1/2007 | Jiang et al. | |
| 7,195,834 B2 | 3/2007 | Srinivas | |
| 7,276,314 B2 | 10/2007 | Gao et al. | |
| 8,021,496 B2 | 9/2011 | Yakovleva et al. | |
| 8,158,282 B2 | 4/2012 | Zhamu et al. | |
| 8,529,746 B2 | 9/2013 | Grant et al. | |
| 9,598,789 B2 | 3/2017 | Grant et al. | |
| 9,748,599 B2 | 8/2017 | Grant et al. | |
| 10,128,491 B2 | 11/2018 | Grant et al. | |
| 2003/0138703 A1 | 7/2003 | Yamaguchi | |
| 2003/0143461 A1 | 7/2003 | Poehler et al. | |
| 2003/0170547 A1 | 9/2003 | Kim et al. | |
| 2004/0002005 A1 | 1/2004 | Gao et al. | |
| 2004/0265685 A1 | 12/2004 | Popov et al. | |
| 2005/0140278 A1 | 6/2005 | Kato | |
| 2006/0032752 A1 | 2/2006 | Luch | |
| 2006/0057448 A1 | 3/2006 | Miyauchi et al. | |
| 2006/0110660 A1 | 5/2006 | Satou et al. | |
| 2006/0272950 A1 | 12/2006 | Martyak et al. | |
| 2008/0032192 A1 | 2/2008 | Yokomizo et al. | |
| 2008/0073217 A1 | 3/2008 | Takezawa | |
| 2008/0206641 A1 | 8/2008 | Christensen et al. | |
| 2009/0288856 A1 | 11/2009 | Sandoval et al. | |
| 2010/0047695 A1 | 2/2010 | Smart et al. | |
| 2010/0120179 A1 | 5/2010 | Zhamu et al. | |
| 2010/0291443 A1 | 11/2010 | Farmer | |
| 2010/0297509 A1 | 11/2010 | Okumura et al. | |
| 2011/0226987 A1 | 9/2011 | Yakovleva et al. | |
| 2011/0236751 A1 | 9/2011 | Amiruddin et al. | |
| 2012/0107680 A1 | 5/2012 | Amiruddin et al. | |
| 2012/0251880 A1 | 10/2012 | Utsunomiya | |
| 2012/0276450 A1 | 11/2012 | Chen et al. | |
| 2012/0308884 A1 | 12/2012 | Oguni et al. | |
| 2013/0314051 A1 | 11/2013 | Takezawa | |
| 2014/0166491 A1 | 6/2014 | Grant et al. | |
| 2016/0218351 A1 | 7/2016 | Dudney et al. | |
| 2016/0260967 A1 | 9/2016 | Matus et al. | |
| 2018/0040914 A1 | 2/2018 | Grant et al. | |
| 2019/0013513 A1* | 1/2019 | Liu | H01M 4/134 |
| 2019/0109322 A1 | 4/2019 | Grant et al. | |
| 2019/0157714 A1* | 5/2019 | Song | H01M 10/0569 |

FOREIGN PATENT DOCUMENTS

| | | |
|---|---|---|
| JP | 07-176323 | 7/1995 |
| JP | 09-022690 A | 1/1997 |
| JP | 11-288712 | 10/1999 |
| JP | 2003091021 A | 3/2003 |
| JP | 2006-156330 | 6/2006 |
| JP | 2008-016199 A | 1/2008 |
| JP | 2008-078199 A | 4/2008 |
| JP | 2008077963 A | 4/2008 |
| JP | 2008091191 A | 4/2008 |
| JP | 2010-238451 A1 | 10/2010 |
| JP | 2011054324 A | 3/2011 |
| KR | 20090021768 A | 3/2009 |
| WO | 98/38224 A1 | 9/1998 |
| WO | 2005/033685 A2 | 4/2005 |
| WO | 2007/098203 A2 | 8/2007 |
| WO | 2008/026595 A1 | 6/2008 |
| WO | 2008/124167 A1 | 10/2008 |
| WO | 2009/133411 A1 | 11/2009 |
| WO | 2012124244 A1 | 9/2012 |
| WO | 2013169862 A2 | 11/2013 |
| WO | 2016073438 A1 | 5/2016 |

OTHER PUBLICATIONS

Rauh, R. D. et al., "The Effect of Additives on Lithium Cycling in Propylene Carbonate", Electrochimica Acta, 22, 1977, 75-83.
Selim, R. et al., "Some Observations on Rechargeable Lithium Electrodes in a Propylene Carbonate Electrolyte", Journal of the Electrochemical Society, 121(11), 1974, 1457-1459.
Whittingham, M. S. et al., "Lithium Batteries and Cathode Materials", Chemical Reviews, 104(10), 2004, 4271-4301.
Zou et al., "Remarkably enhanced capacitance of ordered polyaniline nanowires tailored by stepwise electrochemical deposition," J. Solid State Electrochem., 11: 317-322 (2007).
Wang, Z. et al., "Application of Stabilized Lithium Metal Powder (SLMP) in graphite anode—A high efficient prelithiation method for lithium-ion batteries", J. of Power Sources, 260, Mar. 13, 2014, 57-61.

\* cited by examiner

METHOD FOR FORMING AN SEI LAYER ON AN ANODE

RELATED APPLICATIONS

This application is a US National stage entry of International Application No. PCT/US18/41219, which designated the United States and was filed on Jul. 9, 2018, published in English, which claims the benefit of U.S. Provisional Application No. 62/530,609, filed on Jul. 10, 2017. The entire teachings of the above applications are incorporated herein by reference.

BACKGROUND OF THE INVENTION

In the field of rechargeable metal-ion batteries where metal ions are shuttled between anode and cathode, the electrolyte can react on the surface of the electrode at various voltages. An example of said metal ions includes lithium.

Passivation films are formed on the surface of the cathode and anode during the initial cycling of rechargeable metal ion batteries. The formation of the said passivation layers involves irreversible reactions between the metal ions, the active coating materials, the organic solvents and the salts dissolved in the organic solvents. The reaction(s) can involve solvent and salt reduction forming insoluble products and polymerized compounds, as shown in FIG. 1. The passivation film formed at the anode is often referred to as the Solid Electrolyte Interface (SEI) layer and it is responsible for the majority of the irreversible reactions during the formation of the passivation layers.

The SEI plays a protective role that prevents and/or reduces the rate of further irreversible reactions of the anode with the solvent/electrolyte. An example of the consequences of these reactions can be seen in lithium ion batteries, which are typically described as having an irreversible initial loss of 5 to 40%. An ideal SEI should be thin, minimally porous, electrochemically inert, electrically insulating and ionically conductive. Formation of an SEI implies an irreversible loss that normally consumes part of the metal ion inventory present in the battery cathode, reducing the battery capacity. In addition, during this SEI formation gaseous products are formed and accumulate inside the battery. However, SEI formation is essential since without it the cycle life of the battery would be short.

The typical electrochemical formation of the SEI is often referred to as formation cycling. Several electrochemical formation cycling protocols may be employed depending on the specific chemistry. Some of the most common methods used are single- and multi-step current formation and pulse formation. Current can be applied while maintaining the cell at temperatures above room temperature but below the electrolyte boiling point to form specific products that are not produced during room temperature operation, such as inorganic metal salts. The electrochemical formation is sometimes combined with intermittent elevated temperature soaking steps with the elevated temperature being kept below the boiling point of the electrolyte. Depending on the specific chemistry and formation protocol applied, gas created during formation cycling may have to be removed to prevent pressure build up inside the cell, resulting in the introduction of extra degassing steps. In industry, proprietary combinations of these and other processes are used which can result in highly complex formation cycling protocols.

Formation protocols can have a significant economic impact on Li-ion battery manufacturing. The formation process requires the installation of large numbers of cycling stations. In turn, this results in increased capital equipment cost, energy consumption, plant size, and temperature control requirements. Current studies have shown that formation cycling can account for approximately 5% of the full battery cost.

SUMMARY OF THE INVENTION

The present invention relates to the discovery of a non-electrochemical process for the formation of SEI layers in cells in which the anodes have been pre-alkaliated. The novel process can eliminate the need for electrochemical formation of battery cells by providing a non-electrochemical formation procedure of alkaliated anodes. The non-electrochemical method involves soaking or maintaining the battery internal components in an electrolyte before conventional charging, cycling and/or operation.

For the purpose of this discussion, formation refers to the process in which a SEI is first built in a rechargeable metal ion battery. Electrochemical formation involves the application of an external electrochemical driving force (voltage or electrical current) to form the SEI on the anode surface. Non-electrochemical formation involves SEI formation exclusively through chemical pathways, rather than electrochemical pathways. No external electrochemical driving force (electrical current or voltage) is utilized during non-electrochemical formation.

Conventional batteries (those built without pre-alkaliated anodes) are assembled in an inert electrochemical state, in which the anode has a near zero potential/voltage. In this stage there is not sufficient energy to perform the SEI formation reactions between the anode, the organic solvents and the dissolved salts. Therefore, electrical current or a voltage must be applied so that the anode electrode can get to an energy state that allows for the SEI reactions to occur.

When a cell is built using a pre-alkaliated anode, this anode will have an energy level dependent on the degree of alkaliation. The degree of pre-alkaliation can range from as little as 1% to as much as 99% of the total anode capacity and can depend on the specific anode and cathode materials and the cell negative-to-positive ratio. After pre-alkaliation, the anode will have a non-zero potential/voltage and therefore a non-inert energy state. We have discovered that when the pre-alkaliated anode has a potential voltage higher than the voltage at which SEI can form, and if the pre-alkaliation dosage is greater than or equal to the $1^{st}$ cycle irreversible loss of the anode, it is then possible to perform a non-electrochemical SEI formation exclusively through chemical reactions at the anode electrode surface after the cell is built.

By exclusively incorporating a non-electrochemical formation for a battery with pre-alkaliated anodes, the SEI can be formed through a preferred process that reduces manufacturing cost.

The invention provides a method for the formation of a cell, comprising the steps of:
  (a) Pre-alkaliating an anode to a dosage greater than or equal to the $1^{st}$ cycle irreversible loss of the anode. The anode may be graphite, coke, other carbons, tin, tin oxide, silicon, silicon oxide, aluminum, lithium-active metals, alloying metal materials, and mixtures thereof
  (b) Assembling the pre-alkaliated anode, a cathode, a separator and the electrolyte into a sealed cell.

(c) Soaking the cell under conditions and for a time sufficient to form an SEI layer.

(d) Optionally degassing the cell.

The invention can use commercially available pre-alkaliated anodes or include the pre-alkaliation step. In a preferred embodiment, the anode is pre-alkaliated in accordance with existing processes known in the art. The non-electrochemical soak formation step (c) can be implemented for periods of 1 hour to 10 days, preferably 4 hours to 5 days, or more preferably 12 hours to 2 days. The soak temperature may be −20° C. to the boiling point of the electrolyte, preferably 10° C. to 60° C., and even more preferably 20° C. to 40° C. It is understood that a wide range of electrolytes can be used with varying boiling points.

In one embodiment, the battery built with pre-alkaliated anodes is soaked for a pre-determined amount of time at ambient temperature to complete the chemical SEI formation.

In another embodiment, the battery built with pre-alkaliated anodes is soaked for a pre-determined amount of time at a single controlled temperature to complete the chemical SEI formation.

In a further embodiment, the battery built with pre-alkaliated anodes is soaked at different ambient or controlled temperatures for a pre-determined amount of time at each temperature to complete the chemical SEI formation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
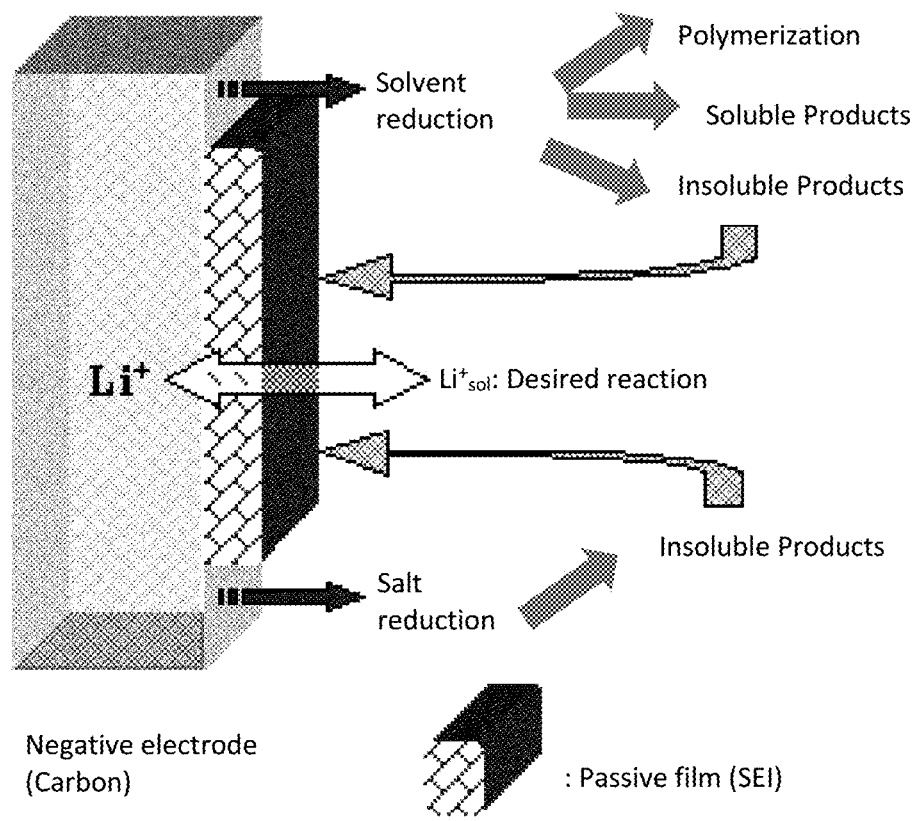
FIG. 1: SEI reactions on anode.

Anodes comprised of graphite, coke, carbons, tin, tin oxide, silicon, silicon oxide, aluminum, lithium-active metals, alloying metal materials, and mixtures thereof, such as anodes comprised of carbon or graphite, are alkaliated during the first charging step of the battery operation after assembly, with the metal coming from the cathode material. In these cases, the cathode is the heaviest and most expensive component of the battery. In addition, this electrochemical formation step adds time, capital and energy resources to the manufacturing of the battery. Therefore, it would be desirable and of commercial importance to design a method for the elimination of electrochemical formation. If a method for non-electrochemical formation is accomplished, then significant reductions in manufacturing time and capital investments can be achieved.

The present invention relates to a method for the non-electrochemical formation of SEI layers in pre-alkaliated rechargeable metal-ion batteries wherein utilization of the said method results in decreased manufacturing times, equipment requirements and energy consumption. The non-electrochemical method involves soaking or maintaining the battery internal components in an electrolyte before conventional charging, cycling and/or operation.

During conventional manufacturing, anodes comprised of carbon or graphite or silicon or silicon/carbon blends are alkaliated during the first charging step of the battery, with the metal coming from the cathode material; a process referred to as electrochemical formation. The specialized cycling equipment used in this process is inherently limited as to the quantity of cells it can cycle at any one time. Each batch of cells being cycled on the specialized equipment typically takes 10-20 hours to complete. Therefore, one of the desirable goals in rechargeable metal-ion battery technology is to eliminate the electrochemical formation step without compromising the battery efficiency and performance. Elimination of the electrochemical formation step will result in lower battery cost and elimination of a manufacturing bottleneck.

A preferred embodiment of the invention is a method for forming an SEI layer on an anode for a rechargeable metal-ion battery, comprising the steps of:

a. Pre-alkaliating an anode to a dosage greater than or equal to the irreversible loss of the anode;

b. Assembling the pre-alkaliated anode, a cathode, a separator and an electrolyte into a sealed cell;

c. Forming an SEI layer by soaking the cell without application of external voltage or current; and d. Optionally degassing the cell.

When a conventional battery is built, the electrochemical formation will result in an irreversible loss due to the formation of the SEI. This irreversible loss can range from 5-40% of the anode capacity depending on the kind of anode material being used. A preferred embodiment of the invention uses anode materials such as graphite, other carbons, silicon, silicon alloys, metal oxides, and combinations thereof.

Figure 2:
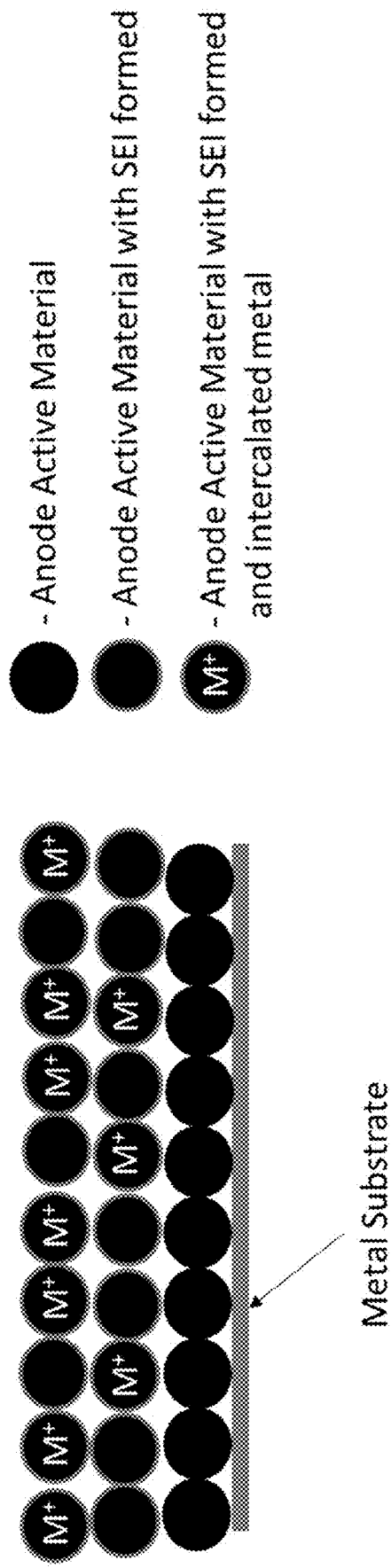
FIG. 2: Example of anode after pre-alkaliation, but before soak.

If an anode with an irreversible loss associated with SEI formation of 15% of the total anode capacity is electrochemically pre-alkaliated to a dosage of 20% of its capacity, about ⅔ of pre-alkaliation dosage will form SEI on the anode surface, and about ⅓ of the dosage will intercalate with the anode active materials in regions where SEI has formed, as illustrated in FIG. 2.

As previously described, a cell is assembled using the pre-alkaliated anode, a cathode, a separator and an electrolyte. In a preferred embodiment, the cell is subsequently left soaking at a controlled or ambient temperature for 1 hour to 10 days, preferably 4 hours to 5 days, or more preferably 12 hours to 2 days. The duration will be affected by the pre-alkaliation dosage via two mechanisms. First, in general, a higher level of pre-alkaliation causes a greater amount of SEI to be formed at the anode surface during the electrochemical pre-alkaliation process, leaving less that must be formed during the soak-formation step. Therefore, cells containing anodes with higher pre-alkaliation dosages require less soaking-formation time than those with lower dosages. Second, higher pre-alkaliation dosages leave the anode at a higher energy state, as measured by cell OCV.

This higher energy state helps with the chemical SEI formation during soaking and reduces the time for the SEI formation reactions to occur.

Figure 3:
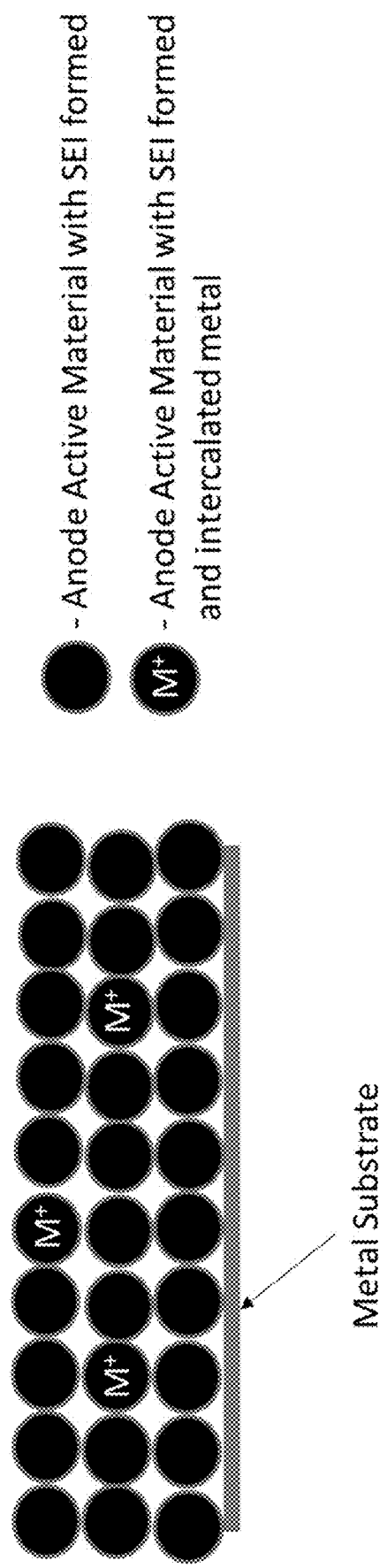
FIG. 3: Example of anode after pre-alkaliation and soak.

The non-electrochemical formation is believed to occur due to the migration of intercalated alkali metal to areas without SEI. When the cell is wetted with electrolyte, intercalated alkali metal migrates to areas without intercalated metal due to concentration gradients. As this intercalated metal migrates to areas without metal, additional SEI is formed in those areas as illustrated in FIG. 3. The electrical conductivity of the anode electrode distributes the potential/voltage, therefore giving areas without metal sufficient energy to perform SEI reactions once the metal migrates into position.

A cell built with a pre-alkaliated anode has a voltage that depends on the pre-alkaliation dosage. The voltage is higher than that of a cell built with a non-pre-alkaliated anode. For example, a conventional cell built with a non-alkaliated anode will typically have an initial open circuit voltage (OCV) of less than 0.5V, while a cell built with a pre-alkaliated anode will typically have an initial OCV higher than 2V. As the pre-alkaliation dosage is increased, the initial OCV of the resulting cell will increase, with the upper limit being determined by the specific anode and cathode used but being approximately 2.9 to 3.5 V.

In a preferred embodiment, the soak temperature may be −20° C. to the boiling point of the electrolyte, preferably 10° C. to 60° C., even more preferably 20° C. to 40° C. It is understood that a wide range of electrolytes can be used with varying boiling points. Performing soak-formation above room temperature for a pre-determined amount of time can also aid the SEI formation. It is well known that chemical reactions are generally accelerated at higher temperatures. In addition, there is a temperature threshold below which the reaction rates are negligible. Therefore, performing soak-formation above room temperature can accelerate the non-electrochemical formation and possibly form desired products that would otherwise not be formed at room temperature. The above room temperature utilized will depend on the anode level of pre-alkaliation prior to cell assembly and the desired SEI characteristics and should not exceed the boiling point of the specific electrolyte. In addition, the above room temperature utilized will depend on several factors related to the battery components, such as solvent vapor pressure, separator thermal stability and anode and cathode electrode active and inactive components. However, the temperature should preferably be kept below the boiling point of the electrolyte to prevent the risk of excessive pressure build up inside the battery cell.

Depending on the specific chemistry of the cell, gaseous products may be formed during non-electrochemical formation, analogous to conventional electrochemical formation. The removal of the gaseous products through a degassing step is easily performed as it is part of conventional battery formation. The process of this invention may require a single degassing step in certain specific cases, while conventional formation normally requires one or more degassing steps.

When the battery built with a pre-alkaliated anode undergoes non-electrochemical formation to the extent of finishing SEI formation, the battery can be immediately cycled at operational rates, eliminating the need for subsequent electrochemical formation.

The process of the present invention will be better understood in connection with the following examples, which are intended as an illustration only and not limiting of the scope of the invention.

Example #1

The following is a detailed example of non-electrochemical formation of cells with pre-alkaliated anodes, tested in half cells. The anode used has an irreversible capacity loss of approximately 10.5% and it was pre-alkaliated to approximately 15% of its total capacity. Alkaliated anodes composed of a silicon-graphite mix are punched to the desired size of approximately 1.5 by 1.5 cm. The anode electrodes are then assembled against lithium metal of approximately the same size in a pouch cell assembly. The separator used was Celgard 2320. The electrolyte used was 1M $LiPF_6$ in 3:7 (EC:EMC) with 2% VC and 10% FEC with moisture levels below 10 ppm. A vacuum was applied to the cell during sealing to remove the gas present and improve electrode and separator wetting. Each cell was soaked, without externally applied voltage or current, for 24, 48 or 72 hours at room temperature or 40° C. All the battery tests were carried out in a custom-made environmental chamber controlled at 26° C. A Maccor model 4300 battery tester was used to test the pouch cells. Each cell was operated at slow cycling rates analogous to formation cycles. For comparison, analogous cells with non-alkaliated anodes were constructed. For those skilled in the art, it is well known that the amount of SEI formed can be estimated from the initial irreversibility of the cell. By subtracting the irreversible loss of a pre-alkaliated anode from that of a non-alkaliated anode, we can infer the SEI formed via non-electrochemical formation in the cells with pre-alkaliated anodes.

Figure 4:
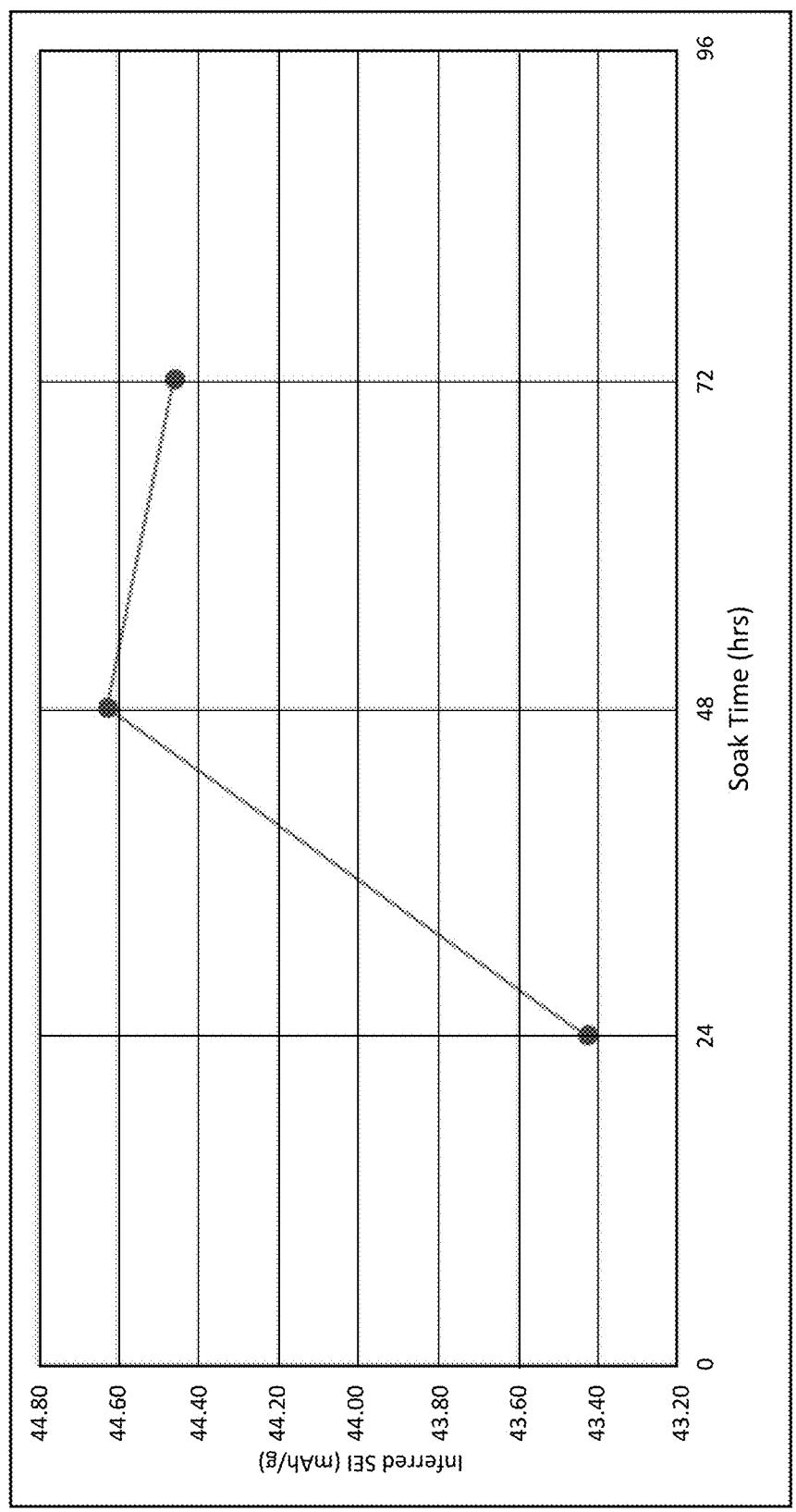
FIG. 4: SEI of alkaliated anodes soaked at room temperature for 24, 48 and 72 hours.
Figure 5:
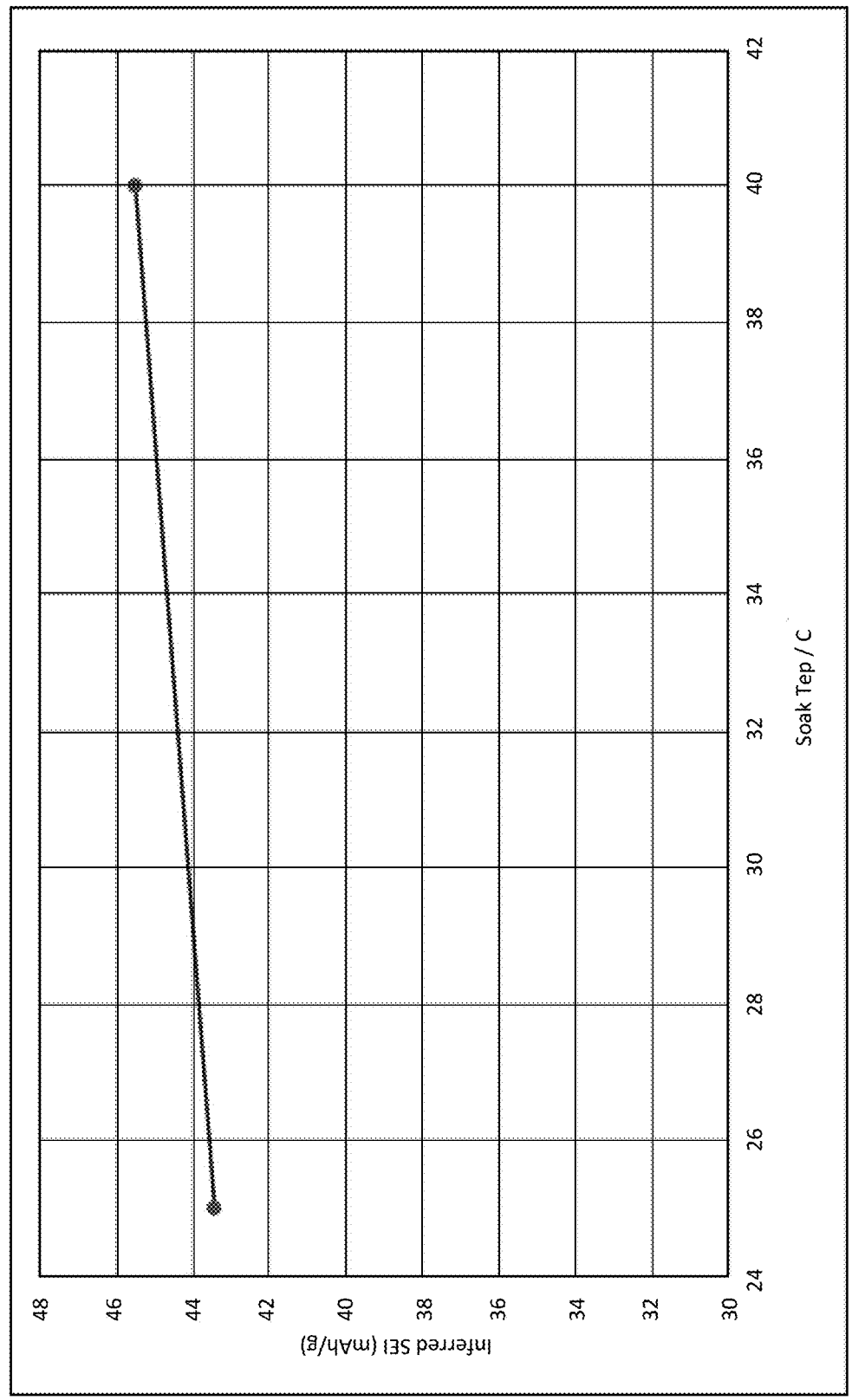
FIG. 5: SEI of pre-alkaliated anodes soaked for 24 hours at 25° C. and 40° C.

FIG. 4 shows the inferred SEI of pre-alkaliated anodes soaked at room temperature for 24, 48 and 72 hours. The result shows that there is an increase of the inferred SEI when the cell is soaked for longer than 24 hours, therefore non-electrochemical formation of the alkaliated anode is occurring. FIG. 5 shows the inferred SEI of pre-alkaliated anodes soaked for 24 hours at 25° C. and 40° C. There is an increase of the inferred SEI at the higher temperature which shows that SEI formation reactions in alkaliated anodes can be accelerated with elevated temperatures. The soaking time and temperature parameters need be optimized for the specific anode and cell chemistry. However, FIG. 2 and FIG. 3 show the feasibility of non-electrochemical cell formation when using pre-alkaliated anodes.

Example #2

The following is a detailed example of full cell preparation and processing. Pre-alkaliated anodes composed of a silicon-graphite mix are punched to the desired size of approximately 3 by 5 cm. The anode used has an irreversible capacity loss of approximately 10.5% and it was pre-alkaliated to approximately 15% of its total capacity. The anode electrodes are then assembled against NCM cathodes of approximately the same size in a pouch cell assembly. The separator used was Celgard 2320. The electrolyte used was 1M $LiPF_6$ in 3:7 (EC:EMC) with 2% VC and 10% FEC with moisture levels below 10 ppm. A vacuum was applied to the cell during sealing to remove the gas present and aid in electrode and separator wetting. The cell was soaked for 24 hrs at room temperature. After this, a small incision was made on the corner of the pouch, a vacuum was applied and the cell was given a final seal while under vacuum. All the battery tests were carried out in a custom-made environmental chamber controlled at 26° C. A Maccor model 4300 battery tester was used to test the pouch cells. One cell was operated at the normal cycling rates without the use of the conventional electrochemical formation cycles at the start.

For comparison, another cell was operated at normal cycling rates after two slow electrochemical formation cycles were used at the start.

Figure 6:
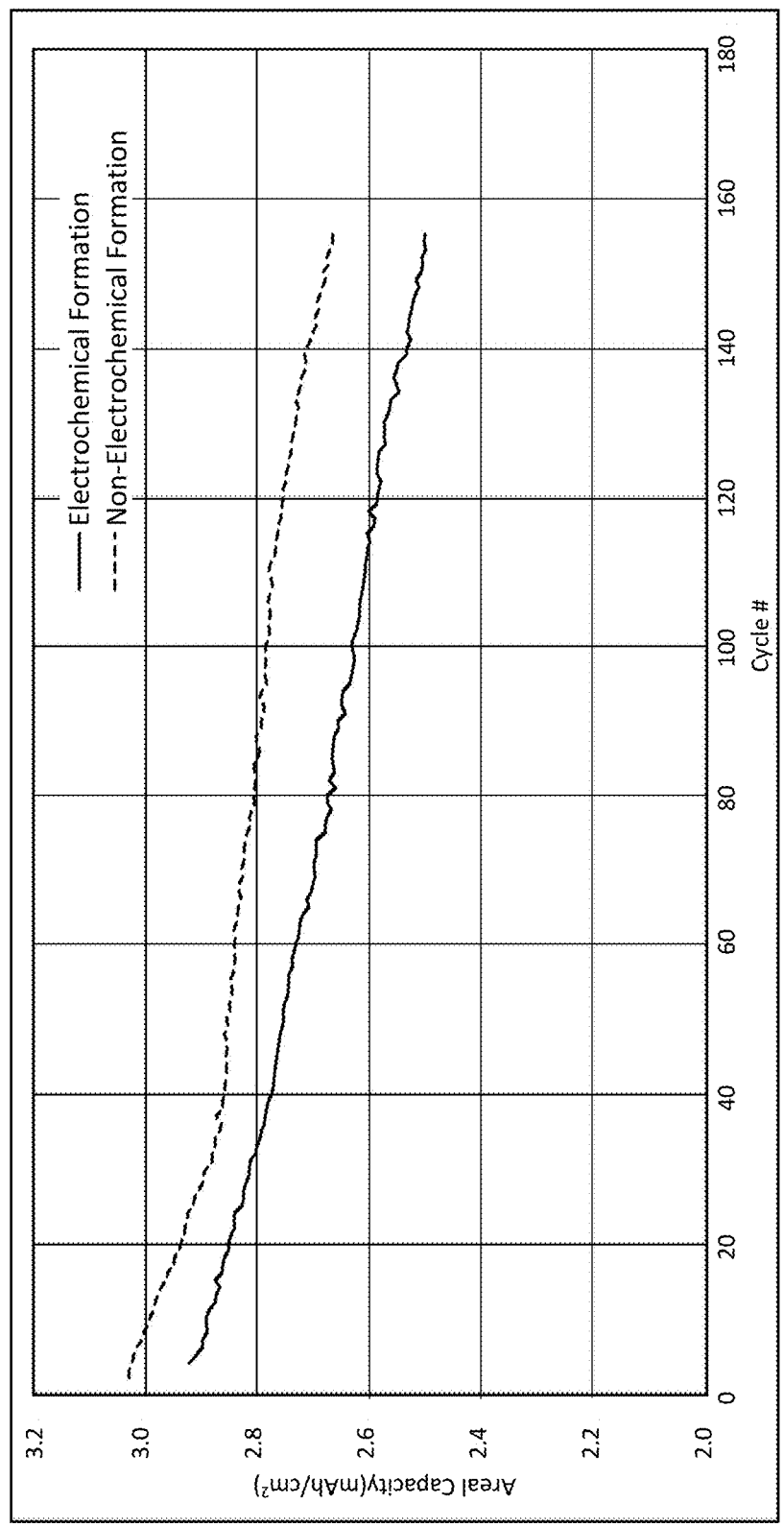
FIG. 6: Areal Capacity of NCM vs. silicon/graphite cells (with electrochemical vs. non-electrochemical formation) tested over an extended range of charge and discharge cycles at approximately a C/2 rate.
Figure 7:
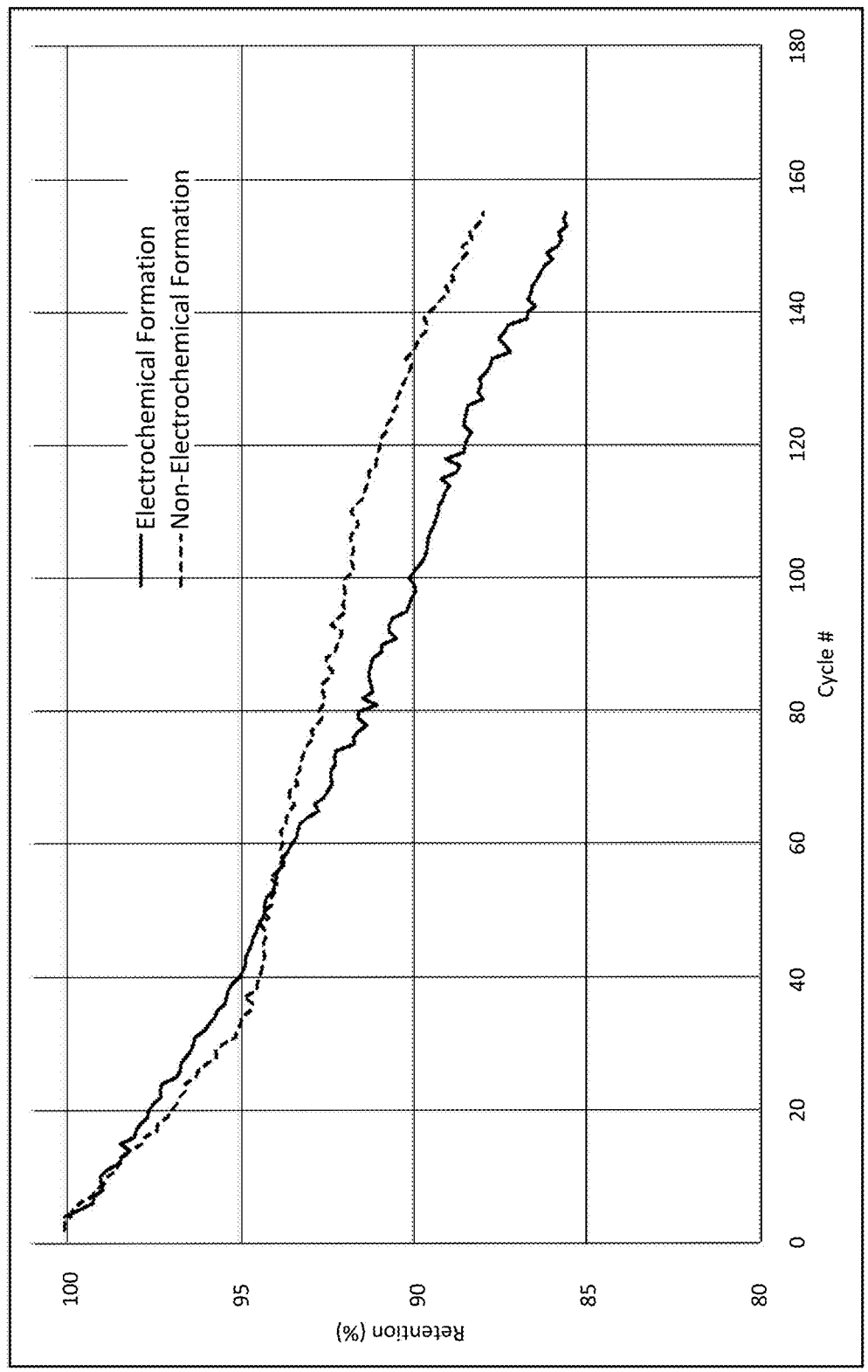
FIG. 7: Capacity retention of full cells with electrochemical vs. non-electrochemical formation.

FIG. 6 and FIG. 7 show the areal capacity and capacity retention of the cells with non-electrochemical and electrochemical formation, tested over an extended range of charge and discharge cycles at approximately a C/2 rate. The results show the effectiveness of the invention and of eliminating the electrochemical formation by comparing the cells through an extended number of cycles.

In a preferred embodiment of the invention, lithiation is used in the pre-alkaliating step. There exist processes known in the art such as that found in US 20130327648 A1 (Grant et al.), incorporated herein for reference, which have yielded excellent results with the current invention.

A method for fabricating a lithiated anode which provides increased amounts of lithium available for cycling, improved reversible capacity during charge and discharge of a rechargeable battery and a consequent lighter battery is preferred. Electrolytic field plates are held at a voltage necessary to establish a field between the anode and the field plate, and to lithiate the anode, such as to plate or intercalate lithium onto a foil, or into an anode substrate or sheet, or to form an SEI layer upon the anode. A typical operating voltage for this is 4.1V. An appropriate reference electrode, such as Ag/AgNO$_3$ non-aqueous reference from Bioanalytical Systems, Inc., located close to the targeted negative electrode may be preferred to monitor the anode conditions. It is possible to operate the field plates in either voltage or current control mode. With current control, the full operating potential may not be immediately obtained. This operation under current control may result in lower initial operating voltages. This lower voltage may prefer secondary side reactions instead of the dissociation of the lithium halide salt (e.g. LiCl) and the resulting intercalation of the anode material. Operating under voltage control can ensure that the field plate potential is immediately set to a sufficient potential to favor the dissociation of the lithium halide salt (e.g. 4.1 Volt for LiCl) and to minimize secondary side reactions. Current control can alternatively be used if the subsequent operating voltage remains above the lithium halide salt dissociation threshold. This can be done by setting a sufficiently high initial current density (e.g. between about 0.5 and 2 mA/cm$^2$, preferably about 1 mA/cm$^2$) that will favor the dissociation rather than secondary side reactions. An oxidizing current is applied at the field plate, so there is a need to use an inert material or a conductive oxide. In one embodiment, the inert material comprising the field plate is selected from glassy carbon, tantalum, gold, platinum, silver, and rhodium. The inert material comprising the field plate is selected from platinum, gold or carbon. Preferably, the inert material comprising the field plate is carbon or glassy carbon. The field plates may also be comprised of a base material such as stainless steel that is plated with an inert conductive material such as gold, platinum, or glassy carbon. The field plates are immersed within the bath, with the anode passing between the field plates. The field plates can be operated as a single entity at a single controlled voltage or current density, or multiple plates can be implemented that allow for independent control of voltage or current density over multiple zones.

The anode typically comprises a compatible anodic material which is any material which functions as an anode in an electrolytic cell. The term anode is equivalent to the terms negative electrode, conductive foil, anode sheet, anode substrate, or non-reactive plating-capable foil. In one embodiment, anodes are lithium-intercalating anodes. Examples of materials that comprise lithium-intercalating anodes include but are not limited to carbon, graphite, tin oxide, silicon, silicon oxide, silicon alloys, silicon oxide, binders such as polyvinylidene difluoride (PVDF), lithium polyacrylate (LiPAA), polyacrylic acid (PAA), carboxymethyl cellulose (CMC), styrene-butadiene rubber (SBR) or polyimide (PI), and mixtures thereof. In a further embodiment, lithium-intercalating anode materials are selected from graphite, cokes, mesocarbons, carbon nanowires, carbon fibers, silicon nanoparticles or other metal nanomaterials and mixtures thereof. In another embodiment, alloying metals such as tin or aluminum may be used to host the lithium metal as a result of the lithiation. A reducing current is applied to the anode in such a way as to intercalate the lithium. The anode is bathed in a solution comprising a non-aqueous solvent and at least one dissolved lithium salt. The term non-aqueous solvent is a low molecular weight organic solvent added to an electrolyte which serves the purpose of solvating the inorganic ion salt. Typical examples of a non-aqueous solvents are butylene carbonate, propylene carbonate, ethylene carbonate, vinylene carbonate, vinyl ethylene carbonate, dimethyl carbonate, diethyl carbonate, dipropyl carbonate, methyl ethyl carbonate, acetonitrile, gamma-butyrolactone, triglyme, tetraglyme, dimethylsulfoxide, dioxolane, sulfolane, room temperature ionic liquids (RTIL) and mixtures thereof. In one embodiment, a non-aqueous solvent is selected from ethylene carbonate, vinylene carbonate, vinyl ethylene carbonate, gamma-butyrolactone, and mixtures thereof. In a second embodiment, a non-aqueous solvent is gamma-butyrolactone. In a third embodiment, an additive can be introduced to support high quality SEI formation. The additive could be vinylene carbonate, ethylene carbonate or maleic anhydride. In a fourth embodiment, a gas such as $CO_2$ or $SO_2$ is sparged into the non-aqueous solution in order to: increase salt solubility; increase the ionic conductivity; support the formation of an $Li_2CO_3$ or $Li_2SO_3$ SEI layer; and increase the lithiation efficiency.

The term alkali metal salt refers to an inorganic salt which is suitable for use in a non-aqueous solvent. Examples of suitable alkali metal cations comprising an alkali metal salt are those selected from $Li^+$, $Na^+$, $K^+$, $Rb^+$, $Cs^+$, $Fr^+$, and mixtures thereof. Examples of suitable halogen anions comprising an alkali metal salt are those selected from $F^-$, $Cl^-$, $Br^-$, $I^-$, and mixtures thereof. In one embodiment, the alkali metal salt is selected from LiF, LiCl, LiBr, NaF, NaCl, NaBr, KF, KCl, KBr, and mixtures thereof. Other salts such as $LiNO_3$ may be used, but in the preferred embodiment, the alkali metal salt is the halide LiCl.

Inexpensive salts with gaseous decomposition products can be halides such as LiCl, LiBr, and LiF. LiCl and other simple salts can be difficult to dissolve or ionize in non-aqueous solvents. Solvents such as propylene carbonate (PC), dimethyl carbonate (DMC), and acetonitrile support only trace amounts of LiCl in solution without the use of a complexing agent such as $AlCl_3$. $AlCl_3$ and other complexing agents can be difficult to handle in regard to moisture management and high corrosivity. In addition, some solvents that can dissolve halide salts, such DMSO or tetrahydrofuran (THF), do not allow complete ionization of the salt, and/or attack the binding polymers in the anode composites. Gamma-butyrolactone has been found to facilitate the dissolution and ionization of the desirable alkali metal halide salts. It combines good solubility of the alkali metal halide salts with compatibility with TFE Teflon$_C$, PVDF, butadiene rubber and other binders. The use of halide salts with gaseous decomposition products such as LiCl prevents the production of solid precipitates during the lithiation process.

Since the lithiation process products are primarily lithium ions and gas, there are few solid precipitates or intermediate compounds that can accumulate in the non-aqueous solvent solution. Removal of dissolved gas from the non-aqueous solvent solution is preferred over solid precipitates during long term continuous operation of a production system.

Gamma-butyrolactone also has a capable electrochemical window, including the lithium potential near −3 volts vs. a standard hydrogen electrode (SHE). It is a capable electrolyte with high permittivity and low freezing point, and can dissolve and ionize up to a 1 M concentration of LiCl. A modest amount of heat can be used to reach this value. In one embodiment, the heat to dissolve and ionize up to a 1 M concentration of LiCl is between about 30° C. and 65° C., such as between about 38° C. and 55° C. However, it has been discovered that solubility of LiCl decreases with an increase in temperature. Thus, a preferred temperature for the pre-alkaliation step is about room temperature, or between about 20° C. and 30° C. The lithiation tank can also have an internal circulating pump and distribution manifold to prevent localized salt concentration deprivation.

Dissolved gas such as $CO_2$ or $SO_2$ can enhance the lithiation process. It increases the solubility of the salt, the ionic conductivity of the non-aqueous solvent, and doubles the efficiency of lithiation. Since $CO_2$ is inexpensive, easily dried, chemically safe, and a potential building block gas for a high quality SEI layer, it has been selected as the preferred dissolved gas. $CO_2$ preferentially reacts with trace $H_2O$ and $Li^+$ during the lithiation process to form a stable, insoluble SEI material ($Li_2O$, $Li_2CO_3$ etc.). The moisture level in the lithiation tank is driven down by the consumption of $CO_2$ and $H_2O$ according to this process, and care is given to control the moisture level in the tank to between about 5 to 20 ppm. In this way, anode lithiation with a quality SEI material is produced continuously.

The intercalation or plating process for lithium ions (or generally lithiation) from 1 M LiCl salt in gamma-butyrolactone solvent will occur at about 4.1 volts measured between the anode sheet and the reference electrode up to a reducing current density of 2 mA/cm$^2$ or more. As intercalation rates are increased too far beyond this current density, dendrites or lithium plating may begin to take place which harm the final battery or electrochemical cell performance. This will vary depending on the graphite porosity etc. In order to control both the currents and dependent voltages accurately, it may be necessary to divide the field plate into zones. Other metals can also be plated or intercalated with this method including sodium as an example. As mentioned above, the byproduct of the intercalation process when using a halide alkali metal salt is an evolving gas at the counter electrode (field plate). In a preferred embodiment, the evolving gas is selected from $F_2$, $Cl_2$, $Br_2$, and mixtures thereof. In a more preferred embodiment, the evolving gas is $Cl_2$.

Prior to entering the lithiation bath, the anode material can be pre-soaked in an electrolyte solution. The pre-soaking of the anode material will ensure full wetting of the material prior to the start of the lithiation process. This pre-soak bath can contain a non-aqueous solvent with or without a lithium salt, with or without a sparge gas, and with or without an SEI promoting additive. Preferably, the pre-soak step is without lithium salt.

The evolution of gas at the field plate or counter electrode can result in evolving gas entering into, and/or being released from, the bath solution. As a result, controlling the build-up of dissolved and released gas is desired to avoid corrosion, as for example, in the hypothetical case of trace water contamination reacting with chlorine gas, to form HCl during chlorine gas evolution. The tank assembly can be configured to control the introduction of moisture into the system by using a dry gas blanket on top of the liquid. In one embodiment, the dry gas (1-10 ppm moisture) is selected from helium (He), neon (Ne), argon (Ar), krypton (Kr), xenon (Xe), sulfur hexafluoride ($SF_6$), nitrogen ($N_2$), dry air, carbon dioxide ($CO_2$) and mixtures thereof. In a preferred embodiment, the dry gas is selected from nitrogen, argon, carbon dioxide, dry air and mixtures thereof. Moisture ingress can also be controlled by having a long narrow gap entry and exit tunnel for the anode film where a counter flowing dry gas is used to mitigate air entry into the system.

A process and apparatus that continuously controls moisture, gas, and small quantities of lithiated organic compounds during a continuous lithiation process is preferred. Liquid is drawn from a bath through a series of valves. The liquid can be delivered in a batch mode to a refluxing unit, or it can be continuously circulated through a conditioning loop including distillation or reverse osmosis. The reflux unit can take batches of material through a vacuum refluxing process that will remove both accumulated gas as well as moisture from the liquid. In one embodiment, the accumulated gas is selected from $F_2$, $Cl_2$, $Br_2$, and mixtures thereof. In a more preferred embodiment, the accumulated gas is $Cl_2$. The use of reflux conditioning instead of a distillation process can prevent a change in the salt concentration of the working fluid which would result in a loss of salt content through precipitation. Once the batch liquid has been refluxed for a designated period of time, the liquid can be returned to the bath with a lower moisture and gas content. The size and rate of the reflux unit can be matched to the moisture ingress rate and to the gas production rate in order keep the bath liquid at optimum conditions. The reflux rate can be increased through use of multiple simultaneous batches and through the use of high rate reflux equipment such as a rotary evaporator and high vacuum conditions. The reflux batch moisture content typically decays in an exponential fashion and the turnover rate can be tuned for optimal moisture control with minimal energy input and equipment cost.

The refluxing unit can be placed after a salt dosing unit. The salt dosing unit can be used to add and mix the desired salt into the non-aqueous solvent solution. The temperature of the dosing unit can be held to maximize the solubility of the salt in the electrolyte and the elevated temperature can also be used as a pre-heating step for the refluxing unit. In one embodiment, the dosing unit maintains an elevated process temperature of between about 30° C. and 65° C., such as between about 38° C. and 55° C. However, it has now been discovered that a preferred temperature is about room temperature, or between about 20° C. and 30° C. The benefit of dosing in the salt in a dosing unit before the refluxing unit is that the salt does not have to be in a completely dry state. Removing the moisture from a solid phase salt can be very difficult. Once a salt is dissolved into solution, however, the water content of the salt can be removed through the refluxing process. Maintaining the dosing unit at an elevated temperature increases the solubility of the lithium salt in the non-aqueous solvent and ensures full dissolution of the salt prior to the refluxing unit.

The conditioning/replenishment loop operates in a continuous mode and can also be used to remove dissolved gases from the bath liquid through use of a membrane contactor. The gas output from the membrane contactor and the reflux unit can be passed through a scrubber to capture any effluent, such as chlorine gas, produced by the process. In one embodiment, the dissolved gases are selected from $F_2$, $Cl_2$, $Br_2$, and mixtures thereof. In a more preferred embodiment, the dissolved gas is $Cl_2$. The bath liquid can also be paired against either vacuum or a dry gas within the membrane contactor in order to remove unwanted gases. In one embodiment, the dry gas is selected from helium (He), neon (Ne), argon (Ar), krypton (Kr), xenon (Xe), sulfur hexafluoride ($SF_6$) nitrogen ($N_2$), carbon dioxide ($CO_2$), dry air and mixtures thereof. In a preferred embodiment, the dry gas is selected from nitrogen, argon, carbon dioxide, dry air and mixtures thereof.

An inline heater can be used to establish or maintain an elevated tank temperature to maintain consistent bath operating conditions, even with variations in facility temperature, as discussed above. As the lithiation reaction is exothermic, it can be desirable to cool the bath.

A filter unit can be used to remove any accumulated particulate contamination. The filter unit can be located at various points in the loop including prior to the pump and after the salt dosing unit. The filter unit can be used to remove particulates from the non-aqueous solvent in cases where a non-halide lithium salt such as $LiNO_3$ is used such that a precipitate is formed at the field plates.

Lithium halide salt can be added to the non-aqueous solvent using the salt dosing unit. An excess of solid lithium salt can be maintained within the dosing unit to keep the lithium salt concentration within the loop and within the bath at the desired level (i.e., a saturated solution of about 0.5 M to 1.0 M) over long periods of time. The dosing unit can be configured to keep the solid salt from entering the bath or refluxing unit. By dosing salt prior to the refluxing unit, there is no need to separately dry the salt with its high water binding energy in its granular state. In one embodiment, the lithium salt within the salt dosing unit is selected from LiF, LiCl, LiBr, and mixtures thereof. In a preferred embodiment, the lithium halide salt within the salt dosing unit is LiCl. Dissolved lithium salts can be carried through the rest of the loop. The fluid circulation loop pump rate can be matched to maintain a constant lithium salt concentration in the tank. For a given anode substrate process rate, a matching loop circulation rate will dose the same amount of lithium salt as the lithiation process consumes. As the anode process rate is increased or decreased, the loop circulation rate can be modified to maintain an equilibrium state within the bath.

Depending on the specific tank conditions, the bath fluid can be treated using a circulating loop, a refluxing unit or a distillation unit as shown in FIGS. 2 and 4. A circulating loop can dose in salt, remove dissolved gases, control the bath temperature and removed particulate contaminants. A refluxing unit is effective at removing dissolved gases and for removing moisture content without reducing the salt content of the solution. A distillation unit is effective at removing dissolved gases, removing moisture content, removing all salt content and removing lithiated organic compounds. The output from the distillation unit can be fed back into a dosing and refluxing unit to reestablish the salt content if required. The effluent from the distillation unit can be collected and treated to recover used salt for reuse in the lithiation process. For example, DMC solvent will rinse away all but the insoluble salt so that the salt may be re-introduced into the dosing unit. Recirculating loops, refluxing unit and distillation units can be shared across multiple tanks that have different input and output requirements as a means of minimizing equipment size and cost.

When the anode is lithiated to the extent of the irreversible and extended cyclic loss amount, it can be assembled into a rechargeable battery or electrochemical cell with a smaller amount of lithium-bearing cathode material than would otherwise be required, thereby improving the specific capacity, specific energy, volumetric capacity density and volumetric energy density of the cell while reducing its cost.

When the anode is lithiated to the extent of the irreversible and extended cyclic loss amount, as well as the intended cycling amount, it can be assembled into a battery or electrochemical cell with a cathode material that does not initially contain lithium. This type of cathode material can be much less expensive than lithium containing cathode materials, and examples include, but are not limited to, $MnO_2$, $V_2O_5$ and polyaniline.

EXAMPLES

The following is a detailed example of an anode preparation and processing. 25 micron thick copper foil was cleaned with isopropyl alcohol and Kimberly-Clark Kimwipes to remove oil and debris and then dried in air. A solution was prepared by adding 2.1 grams of 1,000,000 weight PVDF powder from Arkema Fluoropolymers Div. to 95 ml of dry NMP solvent from Aldrich Chemical. The solution was mixed with a stir bar overnight to fully dissolve the PVDF material. The solution was kept in the dark to prevent the light sensitive solvent from reacting. 33.9 ml of this PVDF solution was then added to 15 grams of Conoco Philips CPreme G5 graphite and 0.33 grams of acetylene black and stirred for 2 hours in a ball mill at 600 RPM without any mixing balls. The resulting slurry was cast onto the copper foil using a vacuum hold down plate with heating capability. The finished graphite thickness after casting and drying at 120° C. was about 100 microns or 14 mg/$cm_2$. The anode sheet was then die punched into 15 mm diameter discs and then pressed at about 3000 psi and 120° C. for use in a 2032 button cell assembly. The copper/graphite anode discs were then vacuum baked at 125° C. and about 1 mTorr in a National Appliance Company model 5851 vacuum oven for at least 12 hours.

The anode discs were then transferred into a Terra Universal dry air glove box with −65° C. dew point air supplied by compressed dry air passed through a Kaeser two stage regenerative drier. The anode discs were then vacuum infiltrated with a GBL solvent with a 0.5 M concentration of LiCl salt solution. This electrolyte solution had been prepared by heating to 90° C. and then vacuum refluxing at about 1 mTorr for 6 hours to remove moisture down to about 10 ppm. The anode discs were allowed to soak for a half hour at vacuum conditions, a half hour in atmospheric pressure conditions and a half hour in the lithiation vessel itself prior to any currents being passed. The lithiation vessel included a constant bubbling of $CO_2$ gas to achieve a saturation level and a temperature of 30° C. Test leads from a Maccor 4300 battery tester were connected to the anode sample (red working) and glassy carbon (black counter) electrode. Voltage at the working electrode is monitored via a Ag/$AgNO_3$ non-aqueous electrode. A reducing current of 2 mA/$cm^2$ was applied to the graphite anode until a total of 1 mAhr/$cm^2$ was achieved. The pre-lithiated anode disc was then rinsed in pure distilled GBL and vacuum dried. The anode discs were then assembled against either $LiFePO_4$ or $LiCoO_2$ 12 mm diameter cathode discs. The separator used was Celguard 2400, and about 0.2 ml of electrolyte was used in the assembly. The electrolyte was 1:1:1 EC:DMC:DEC with 1M $LiPF_6$ salt and 1% VC with moisture levels at about 10 ppm. A vacuum was applied to the assembled cell to remove bubbles before crimping in an MTI model MT-160D crimping tool. Subsequent electrical tests were then performed on the battery tester unit using a 12 hour delay, two about C/12 formation cycles to at least 3.7 volts, about C/3 charge/discharge cycles, and 20 minute rest steps between them. All the battery tests were carried out in a home-made environmental chamber controlled to 26° C.

A Maccor model 4300 battery tester was used to test the CR2032 size button cells assembled with a CPreme graphite anodes, $LiFePO_4$ or $LiCoO_2$ cathodes, and Celguard 2400 separators. Electrolyte solutions containing a 1:1:1 mixture of EC:DMC:DEC with 1 molar concentration of $LiPF_6$ salt and 1% VC were used. Both anodes and cathodes were cast with PVDF binders. First charge and discharge cycles, often called the formation cycles, were performed at a current rate of approximately C/12. The first cycle irreversible loss using pre-lithiated and non-pre-lithiated graphite anodes mounted against $LiFePO_4$ cathodes can be compared. The initial absolute charge capacity of the two samples is different due to extraneous packaging variation. The irreversible losses are representative of the methods described, however. The reversible capacity of the button cell can be 56%. The reversible capacity of the button cell when matched to a pre-lithiated anode can be 98%. A typical $LiCoO_2$/graphite vs. a $LiCoO_2$/pre-lithiated graphite, but otherwise identical sample can be tested over an extended range of charges and discharge cycles at approximately a C/3 rate. The results indicate that there is a long lasting benefit to the battery cell due to pre-lithiation using the methods described.

An example of a salt other than LiCl that has been used by the inventor to achieve lithiation is $LiNO_3$. Reasonable rates of lithiation have been achieved with $LiNO_3$. When the anodes pre-lithiated using $LiNO_3$ were paired with $LiFePO_4$ cathodes, however, poor cycling resulted, possibly due to an unidentified byproduct. This problem can be solved by a slightly more complicated removal process such as an additional anode rinse.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for forming an SEI layer on an anode for a rechargeable metal-ion battery, comprising the steps of:
   a. Pre-alkaliating an anode to a dosage greater than or equal to the irreversible loss of the anode;
   b. Assembling the pre-alkaliated anode, a cathode, a separator and an electrolyte into a sealed cell;
   c. Forming an SEI layer by soaking the cell without application of external voltage or current; and
   d. Optionally degassing the cell.

2. The method of claim 1, wherein the pre-alkaliation step comprises lithiation.

3. The method of claim 1, wherein the anode comprises graphite or other carbons, silicon, tin, silicon alloys, silicon oxides, metal oxides, or combinations thereof.

4. The method of claim 1, wherein forming an SEI layer is performed by soaking the cell for between 1 hour and 10 days.

5. The method of claim 4, wherein forming an SEI layer is performed by soaking the cell for between 1 hour and 2 days.

6. The method of claim 5, wherein the SEI layer is formed at ambient temperature.

7. The method of claim 5, wherein the SEI layer is formed at a temperature between about 10° C. to 60° C.

8. The method of claim 7, wherein the SEI layer is formed by soaking the cell for between 1 hour to 2 days.

9. A method for the formation of rechargeable metal-ion batteries, comprising the steps of:
   a. Pre-alkaliating an anode to a dosage greater than or equal to the irreversible loss of the anode;
   b. Assembling the pre-alkaliated anode, a cathode, a separator and an electrolyte into a sealed cell;
   c. Chemically forming an SEI layer by soaking the cell without application of external voltage or current;
   d. Optionally degassing the cell; and
   e. Charging the anode through application of external voltage and/or current.

* * * * *